US012680375B2

(12) United States Patent
Vianello et al.

(10) Patent No.: US 12,680,375 B2
(45) Date of Patent: Jul. 14, 2026

(54) METHOD FOR MAKING AN INSULATING GLASS

(71) Applicant: FOREL S.P.A. UNIPERSONALE, Roncade (IT)

(72) Inventors: Fortunato Vianello, Roncade (IT); Riccardo Vianello, Roncade (IT)

(73) Assignee: FOREL S.P.A. UNIPERSONALE, Roncade (IT)

( * ) Notice: Subject to any disclaimer, the term of this patent is extended or adjusted under 35 U.S.C. 154(b) by 0 days.

(21) Appl. No.: 19/230,766

(22) Filed: Jun. 6, 2025

(65) Prior Publication Data

US 2025/0297513 A1 Sep. 25, 2025

Related U.S. Application Data

(63) Continuation of application No. PCT/IB2024/058215, filed on Aug. 23, 2024.

(51) Int. Cl.
*E06B 3/673* (2006.01)

(52) U.S. Cl.
CPC ................................ *E06B 3/67326* (2013.01)

(58) Field of Classification Search
None
See application file for complete search history.

(56) References Cited

U.S. PATENT DOCUMENTS

| | | | | |
|---|---|---|---|---|
| 3,876,489 A * | 4/1975 | Chenel | C03B 23/245 156/107 |
| 2011/0154635 A1* | 6/2011 | Wunnicke | E06B 3/67386 29/428 |
| 2016/0290034 A1* | 10/2016 | Lenhardt | E06B 3/67369 |
| 2018/0044972 A1* | 2/2018 | Bauer | B65G 49/061 |
| 2020/0370361 A1 | 11/2020 | Zehner | |

FOREIGN PATENT DOCUMENTS

| | | |
|---|---|---|
| EP | 2964863 B1 | 8/2016 |
| SE | 407960 B | 4/1979 |
| WO | 2011082100 A1 | 7/2011 |

OTHER PUBLICATIONS

International Search Report for International Patent Application No. PCT/IB2024/058215, mailed Oct. 25, 2024.

* cited by examiner

*Primary Examiner* — Abbas Rashid
*Assistant Examiner* — Adrianna N Konves
(74) *Attorney, Agent, or Firm* — CANTOR COLBURN LLP

(57) ABSTRACT

A method for making an insulating glass consisting of at least a first glass plate, a second glass plate, and a central glass plate involves arranging a spacer on the first glass plate, coupling the first glass plate to the central glass plate to make a pre-assembled product, rotating the pre-assembled product by an angle of around 180° with respect to a substantially vertical axis, and arranging a spacer on the second glass plate. The method further involves coupling the second glass plate to the central glass plate of the pre-assembled product to make the insulating glass.

14 Claims, 4 Drawing Sheets

METHOD FOR MAKING AN INSULATING GLASS

CROSS REFERENCE TO RELATED APPLICATIONS

This is a continuation of International Patent Application Number PCT/IB2024/058215 filed on Aug. 23, 2024, which claims priority to Italian Patent Application No. 102023000018123 filed on Sep. 4, 2023, both of which said applications are herein incorporated by reference in their entirety.

TECHNICAL FIELD

The present invention relates to a method for making an insulating glass. In particular, the present invention relates to a method for making an insulating glass with thin central glass.

BACKGROUND

As is known, insulating glass in the simplest configuration thereof consists of two glass plates separated by a spacer which can be rigid, i.e., consisting of metal material, rigid polymer material or mixed metal-polymer material, or flexible supplied on coils, or finally made of thermoplastic material supplied in drums and extruded directly onto the glass through automated machines.

In the case of triple glasses, various assembly modes are known.

In the present invention, reference is made to triple glasses for simplicity of disclosure, however the principles of the present invention can be equally applied to insulating glasses comprising four or more glass plates, as is apparent per se to those skilled in the art.

For example, International Patent Application WO2011/082100A1 describes a method for assembling three glass plates, in which the three plates are arranged inside a press in a pre-assembled configuration. In the pre-assembled configuration, the outer plates are provided with the spacer which is simultaneously applied to the two faces of the central glass plate during pressing.

In order to obtain this pre-assembled condition, one of the outer plates is rotated after being provided with the spacer so that the surface thereof provided with the spacer faces the surface of the other outer plate on which the spacer is provided. During assembly, both outer plates thus have the spacer facing the central plate.

The alternative to this rotation is the arrangement of a further station for applying the spacer, opposite to the first one, i.e., adapted to apply the spacer to the opposite face of a glass plate.

Although feasible, such a solution is a burden in terms of system complexity and cost. In particular, there would be a need to manage a further spacer supply.

The method and apparatus of EP2964863 A1 are also known, in which unlike the preceding case, a pre-assembly of one of the outer glasses with the central glass is carried out, and the spacer is provided on the other outer plate. The outer glass pre-assembled with the central glass is then inserted into the press, and the other outer glass is rotated so that the surface on which the spacer is provided faces the central glass.

Although it is functional, such a solution requires a particular type of "V" press. Indeed, when the plate to which the spacer is applied is rotated, the plate having a non-vertical, but slightly inclined disposition (about) 6° with respect to the vertical, is inclined by 6° in the opposite direction with respect to the disposition of the pre-assembly already performed.

Therefore, although it is widely appreciated and used, the prior art is not adapted to solve the drawbacks of the prior art.

In particular, in the case of triple insulating glass, in which the central plate has a thickness which can reach 0.5 mm, there is a need to move such a plate as little as possible, and in particular there is a need to pay special attention to the arrangement of the spacer thereon, given the fragility and deformability thereof.

BRIEF SUMMARY

Therefore, the need is felt to solve at least partially the drawbacks and limitations mentioned above with reference to the prior art.

Therefore, the need is felt to provide a method for making a triple glass which is more efficient than the methods of the prior art.

Moreover, the need is felt to provide a method which allows keeping the cost of implementing a related apparatus and managing the materials required to apply the spacer, whatever type it is, low.

Again, the need is felt to provide a method which allows obtaining a secure and efficient coupling also in the case of thin central plates.

Such needs are at least partially met by a method for making an insulating glass as described and claimed herein.

DESCRIPTION OF THE DRAWINGS

Further features and advantages of the present invention will be more comprehensible from the following description of preferred, non-limiting embodiments thereof, in which.

The elements or parts of elements common to the embodiments described below will be indicated by the same reference numerals.

DETAILED DESCRIPTION

Figure 1:
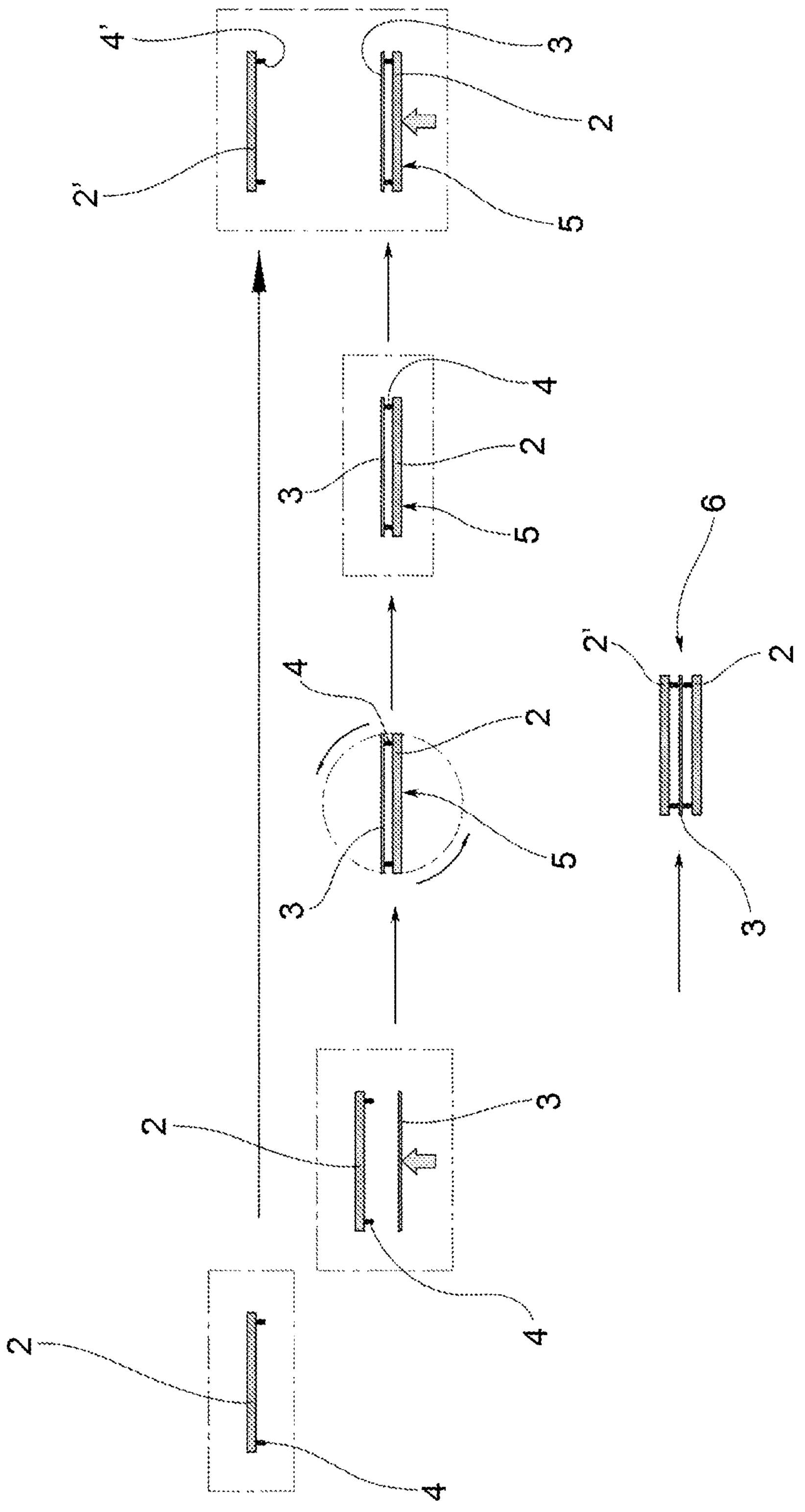
FIG. 1 diagrammatically shows the steps of a possible embodiment of a method for making an insulating glass.

FIG. 1 shows a possible embodiment of a method for making an insulating glass 6 according to the present invention, comprising at least a first outer plate 2, a second outer plate 2', and a central plate 3.

The method essentially comprises the following steps:

(a) arranging a spacer 4 on the first glass plate 2;

(b) coupling the first glass plate to the central plate 3 to make a pre-assembled product 5;

(c) rotating the pre-assembled product 5 by an angle of around 180° with respect to a substantially vertical axis;

(d) arranging a spacer 4' on the second glass plate 2; and (e) coupling the second glass plate 2' to the central plate 3 of the pre-assembled product 5 to make the insulating glass 6.

In this disclosure, substantially vertical means an axis substantially parallel to the direction of the force of gravity, i.e., an axis substantially perpendicular to the lower disposition of the means supporting the plates.

It should also be noted that the glass plates in this type of applications are not exactly vertical, but they are inclined by a few degrees, conventionally 5-6° with respect to such a plane, so as to be easily translated.

The rotation of the pre-assembled product 5 allows arranging the spacer 4' on the second plate 2'. Indeed, in the absence of the rotation of the pre-assembled product 5, the spacer 4' should be arranged on the central glass plate 3. If the central glass plate 3 is very thin (with a thickness of the order of one millimetre, even up to 0.5 mm), accordingly it is very deformable and could be subjected to stresses such as to compromise the integrity thereof.

In this case, the pre-assembled product 5 is only rotated to then be coupled to the second plate 2'.

Figure 3:
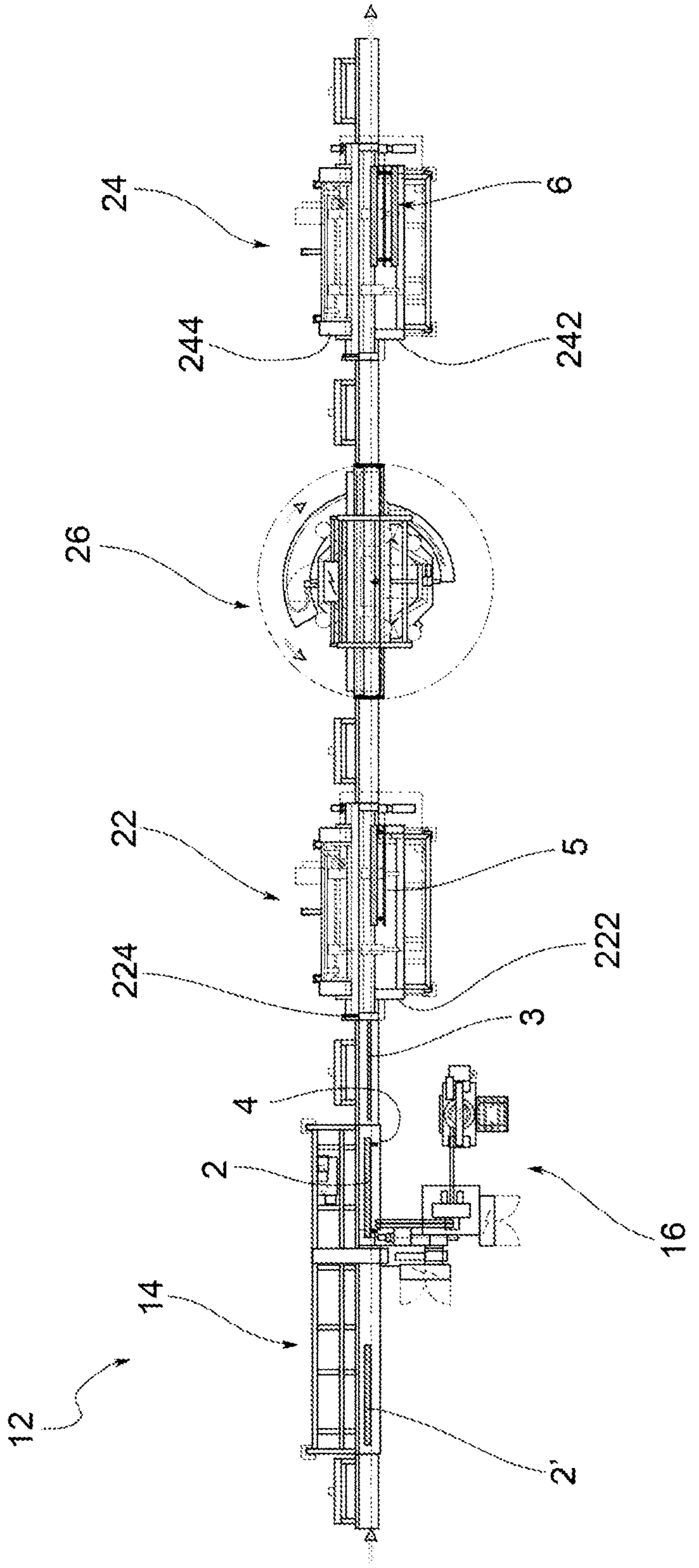
FIG. 3 diagrammatically shows a top plan view of an apparatus carrying out the method schematized in FIG. 1.
Figure 4:
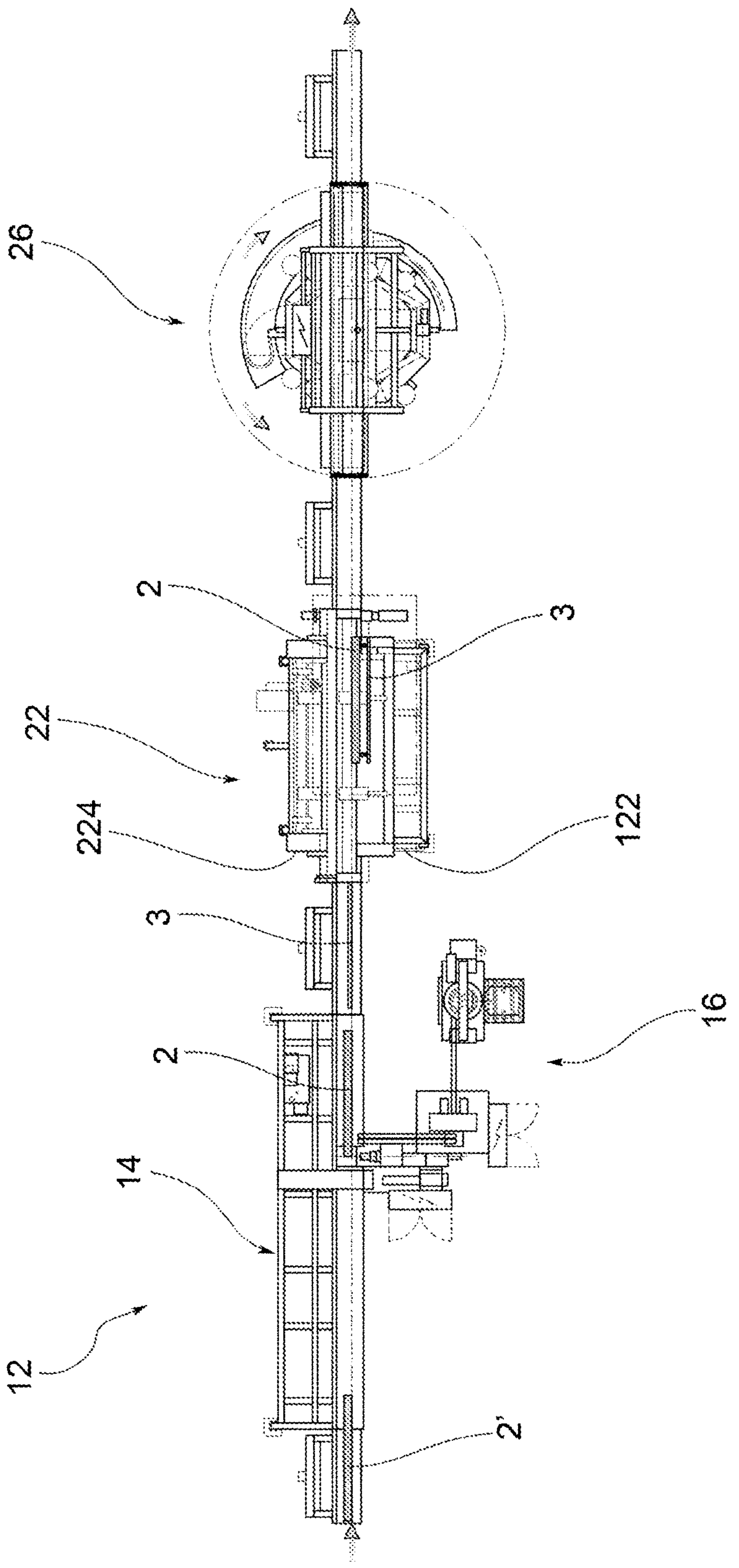
FIG. 4 diagrammatically shows a top plan view of an apparatus carrying out the method schematized in FIG. 2.

According to a possible embodiment, the step (a) of arranging a spacer 4 on the first glass plate 2 occurs in a module 14 for applying a spacer provided with means for applying a spacer. An embodiment of this type is shown in FIGS. 3 and 4, for example.

Step (d) of arranging a spacer 4' on the second glass plate 2' can also occur in the same module 14.

According to a possible embodiment, the means for applying a spacer 16 of module 14 can be adapted to distribute a thermoplastic spacer 4, 4'.

According to specific needs, the step (d) of arranging a spacer 4' on a second plate 2' can be prior to or simultaneous with step (b) of coupling the first glass plate to the central plate 3 to make a pre-assembled product 5. In alternative embodiments, step (d) can start before step (c) and end after the beginning of step (c), according to specific needs.

According to a possible embodiment, the method can comprise a step (c') in which the pre-assembled product 5, in addition to the rotation by an angle of around 180° with respect to a substantially vertical axis of step (c), is also rotated according to an axis substantially parallel to the advancement direction of the glass plates, so that once the rotation of step (c) has been carried out, the pre-assembled product 5 has a disposition substantially parallel to that of the second plate 2'.

FIG. 3 exemplifies a system for making an insulating glass according to the method schematized in FIG. 1.

In a first step, a central plate 3 is conveyed into a first press 22 comprising a fixed plane 224 and a movable plane 222. The central plate is engaged by the movable plane 222 and spaced apart from the fixed plane 224.

The first plate 2 is advanced into module 14 in which the spacer is applied. In the drawing case, this is a module 14 comprising means 16 adapted to distribute a thermoplastic spacer. Such means 16 for distributing a thermoplastic spacer will not be further detailed because they are known per se to those skilled in the art.

After the step of applying the spacer 4 to the first plate 2, the first plate 2 is conveyed into the first press 22 and engaged by the movable plane 222 so that it can be coupled to the central plate 3 to create the product 5.

The product 5 is then transported to a rotating conveyor 26 adapted to rotate the pre-assembled product 5 by an angle of around 180° with respect to a substantially vertical axis.

According to a possible embodiment, the rotating conveyor 26 is adapted to incline the disposition of product 5 so that it is again parallel to the fixed plane 224 of press 22.

As shown in FIG. 3, the product 5 is conveyed into a second press 24 to be engaged with a second plate 2'.

The plate 2' is first conveyed into the module 14 for applying the spacer 4', for example a thermoplastic spacer.

Then, the plate 2' with spacer 4' applied passes through the first press 22 and the rotating conveyor to reach the second press 24.

In the second press 24, the second plate 2' with its own spacer 4' is positioned on the fixed plane 244 while the product 5 is engaged by the movable plane 242.

The press 24 then proceeds to coupling the second plate 2' with product 5.

Figure 2:
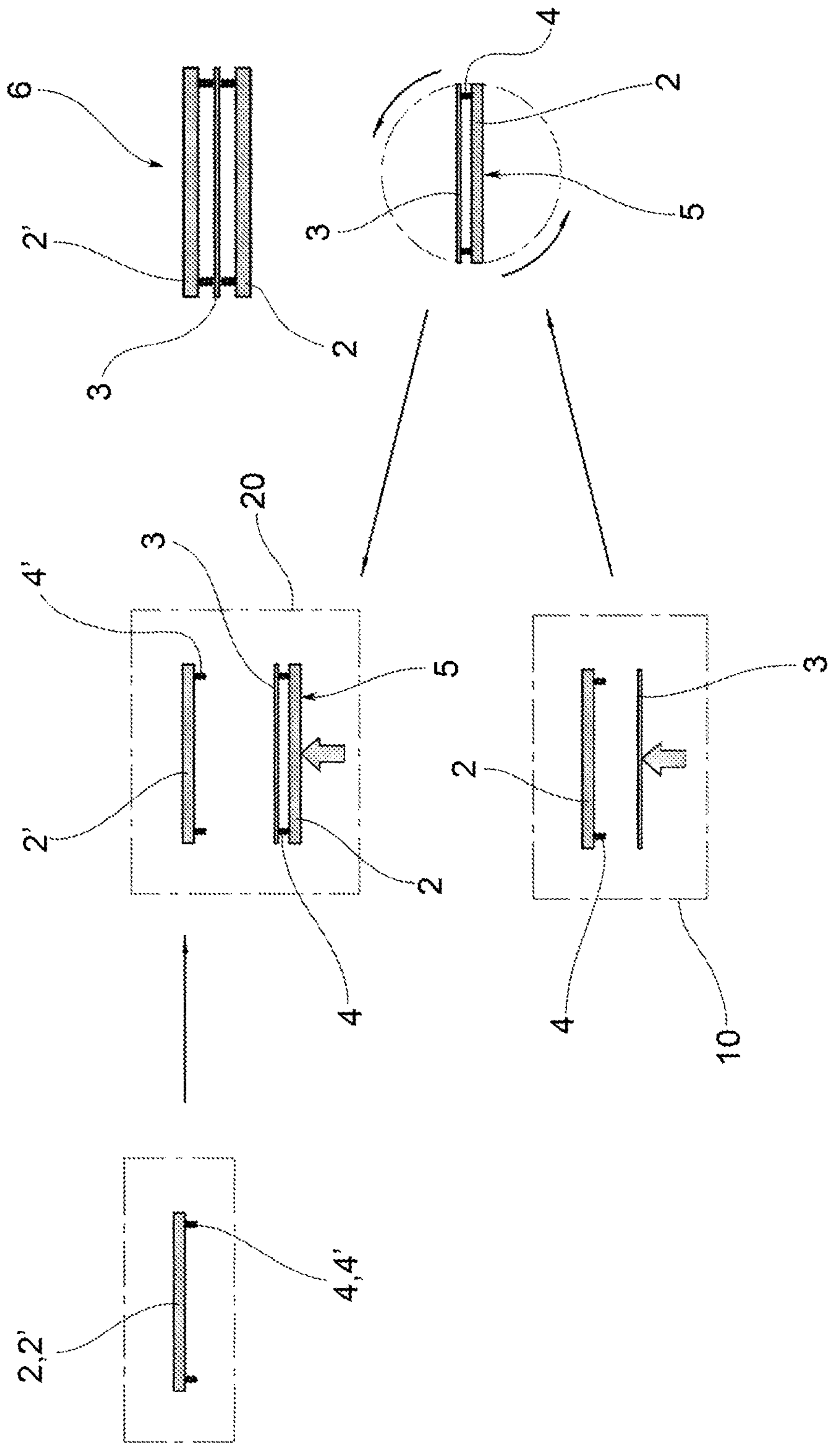
FIG. 2 diagrammatically shows the steps of a possible alternative embodiment of the steps of a method for making an insulating glass.

FIG. 4 shows an alternative embodiment based on the diagrammatic depiction of the method in FIG. 2.

In a first step, a central plate 3 is conveyed into a first press 22 comprising a fixed plane 224 and a movable plane 222. The central plate is engaged by the movable plane 222 and spaced apart from the fixed plane 224.

The first plate 2 is advanced into module 14 in which the spacer is applied. In the drawing case, this is a module 14 comprising means 16 adapted to distribute a thermoplastic spacer. Such means 16 for distributing a thermoplastic spacer will not be further detailed because they are known per se to those skilled in the art.

After the step of applying the spacer 4 to the first plate 2, the first plate 2 is conveyed into the first press 22 and engaged by the movable plane 222 so that it can be coupled to the central plate 3 to create the product 5.

Product 5 is then transported to a rotating conveyor 26 adapted to rotate the pre-assembled product 5 by an angle of around 180° with respect to a substantially vertical axis.

According to a possible embodiment, the rotating conveyor 26 is adapted to incline the disposition of product 5 so that it is again parallel to the fixed plane 224 of press 22.

With reference to the advancement direction of the glass plates, the conveyor 26 can be positioned following the first press 22, as shown in FIG. 4, or be positioned between the module 14 for applying the spacer 4 and the first press 22.

As shown in FIG. 2, the product 5 is conveyed again into the first press 22 to be coupled with a second plate 2'.

The plate 2' is first conveyed into the module 14 for applying the spacer 4', for example a thermoplastic spacer.

The plate 2' with the spacer 4 applied is then conveyed to the first press 22.

In the first press 22, the second plate 2' with its own spacer 4' is positioned on the fixed plane 224 while the product 5 is engaged by the movable plane 222.

The first press 22 then proceeds to coupling the second plate 2' with product 5.

Therefore, the advantages that can be achieved by the present invention are now apparent.

In particular, there is provided a method for making a triple glass which is more efficient than the methods of the prior art.

Moreover, there has been provided a method which allows keeping the cost of implementing a related apparatus and managing the materials required for applying the spacer, whatever the type is, low.

Again, the method of the present invention allows having a secure and efficient coupling also in the case of thin central plates.

Moreover, the method allows implementing a press of a type known per se and not of the "V" type mentioned at the beginning of the present disclosure.

In other words, there has been provided a method which, by virtue of the use of a particular sequence of apparatuses known per se and generally present in glassworks, allows making triple insulating glasses with a thin central plate.

In order to meet specific needs, those skilled in the art may make changes to the embodiments described above and/or replace the elements described with equivalent elements without departing from the scope of the appended claims.

The invention claimed is:

1. A method for making an insulating glass comprising at least a first glass plate, a second glass plate and a central glass plate; said method comprising steps of:

(a) arranging a first spacer on the first glass plate;

(b) coupling the first glass plate with the central glass plate to make a pre-assembled product;

(c) rotating the pre-assembled product by an angle of around 180° with respect to a substantially vertical axis;

(d) arranging a second spacer on the second glass plate; and (e) coupling the second glass plate with the central glass plate of the pre-assembled product to make the insulating glass.

2. The method of claim 1, wherein step (a) of arranging the first spacer on the first glass plate occurs in a module arranged provided with means for applying the first spacer.

3. The method of claim 2, wherein step (d) of arranging the second spacer on the second glass plate occurs in the module provided with means for applying the spacer.

4. The method of claim 3, wherein the means for applying athe first spacer and the second spacer are adapted to distribute a thermoplastic spacer.

5. The method of claim 1, wherein step (d) of arranging athe second spacer on the second glass plate is before and/or simultaneous with step (b) of coupling the first glass plate with the central glass plate to make the pre-assembled product.

6. The method of claim 1, further comprising a step (c') in which the pre-assembled product in addition to the rotation by an angle of around 180° with respect to the substantially vertical axis of step (c), is also rotated according to an axis substantially parallel to an advancement direction of the glass plates, so that once the rotation of step (c) has been carried out, the pre-assembled product has a disposition substantially parallel to that of the second glass plate.

7. The method of claim 1, wherein step (b) is carried out on a first press comprising a fixed plane and a movable plane and step (e) is carried out in a second press comprising a fixed plane and a movable plane.

8. The method of claim 7, wherein between the first press and the second press a rotating conveyor is arranged.

9. The method of claim 7, wherein in step the pre-assembled product is engaged by the movable plane of the second press.

10. The method of claim 1, wherein step (b) and step (e) are carried out on a first press comprising a fixed plane and a movable plane.

11. The method of claim 10, wherein a rotating conveyor is placed after the first press with reference to an advancement direction of the glass plates.

12. The method of claim 10, wherein a rotating conveyor is placed between a module provided with means for applying the first and second spacer and the first press.

13. The method of claim 10, wherein in step (e) the pre-assembled product is engaged by the movable plane of the first press.

14. The method of claim 7, wherein before step (a) the central glass plate is conveyed inside the first press and is engaged by the movable plane of the first press.

* * * * *